Feb. 25, 1958  R. G. STERN ET AL  2,824,388
TRAINING APPARATUS FOR REPRESENTING AIRCRAFT ENGINE OPERATION
Filed June 14, 1954  6 Sheets-Sheet 1

INVENTORS.
ROBERT G. STERN
WILLIAM H. DAWSON JR.
CLINTON H. HAVILL, deceased, by Katherine R. Havill, Executrix
By Orin R. Severn
their ATTORNEY.

INVENTORS.
ROBERT G. STERN
WILLIAM H. DAWSON JR.
CLINTON H. HAVILL, de
ceased, by Katherine R. Havill, Executrix
By Orin R. Severn
their ATTORNEY.

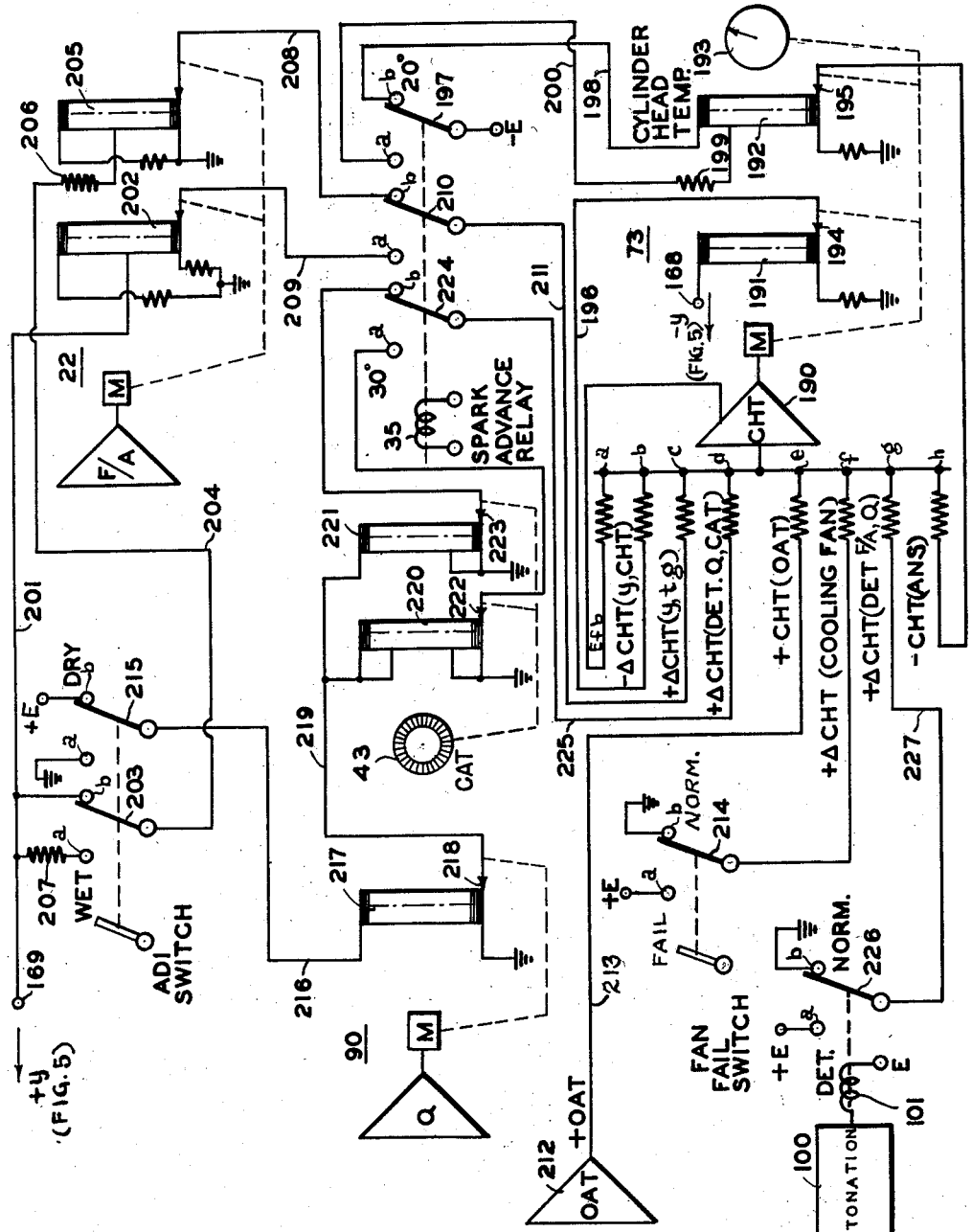

United States Patent Office 2,824,388
Patented Feb. 25, 1958

2,824,388

TRAINING APPARATUS FOR REPRESENTING AIRCRAFT ENGINE OPERATION

Robert G. Stern, West Caldwell, and William H. Dawson, Jr., Waldwick, N. J., and Clinton H. Havill, deceased, late of South Orange, N. J., by Katherine R. Havill, executrix, South Orange, N. J., assignors to Curtiss-Wright Corporation, a corporation of Delaware Application June 14, 1954, Serial No. 436,328

28 Claims. (Cl. 35—12)

This invention relates to ground based training apparatus for instructing aircraft personnel, and in particular to electronic apparatus for computing and representing aircraft engine factors in response to simulated flight and engine control conditions. Specifically, the invention involves electronic computing apparatus having control circuits adjustable, (1) according to simulated flight conditions, such as altitude, outside air temperature and air speed, and (2) by an operator as a student flight engineer for example, in accordance with engine control factors such as engine R. P. M. governor setting, mixture control, spark advance, prime control, fuel pressure, various auxiliary controls, etc., all for the purpose of realistically representing basic engine operating conditions such as torque at the propeller shaft, cylinder head temperature, fuel flow and oil temperature. In addition, controls operable by an instructor may modify or de-energize certain of the computing circuits for introducing "trouble" factors such as back-fire, power failure, etc., requiring corrective action by the flight engineer.

A principle object of the invention, therefore, is to provide improved aircraft training apparatus of the aforesaid character that is especially well adapted for realistic training of flight engineers and associated personnel in the safe, efficient and economical operation of the engines of large multi-engine aircraft according to specified procedure.

The invention will be more fully set forth in the following description referring to the accompanying drawings, and the features of novelty will be pointed out with particularity in the claims annexed to and forming a part of this specification.

Referring to the drawings, Fig. 1 is a partly diagrammatic and schematic illustration of part of the controls and computing circuits of the present invention including computation of indicated horsepower (IHP);

Fig. 6 illustrates the computing circuits for determining and indicating cylinder head temperature (CHT);

Fig. 7 is a chart illustrating characteristic carburetor metering curves.

Basically, the function of aircraft engine simulating apparatus is to compute accurately indicated horsepower as this factor represents the actual power developed by combustion within the engine. It is dependent on a number of simulated flight and engine conditions hereinafter referred to. Brake horsepower, which is the power available at the propeller shaft represents the difference between indicated horsepower and power losses such as blower power, friction, etc., i. e.

$$IHP - losses = BHP$$

The flight engineer's torque meter indication therefore depends on BHP and engine R. P. M. (RPM), the latter being represented here as the engine governor setting for simplicity.

The factors determining IHP are functions of altitude (h), RPM, manifold air pressure (MAP), fuel air ratio (F/A), and carburetor air temperature (CAT), each of which influences the effectiveness of combustion within the engine cylinders. That is, CAT affects air density, MAP affects air density, F/A affects combustion temperature and speed, RPM affects the time of compression, time of expansion and, of course, the number of explosions per minute, and h affects back pressure. The flight crew can by proper manipulations of flight and engine controls select values of these functions which will produce the best power results or the most economical cruising results.

A general formula for IHP can be expressed as follows:

$$IHP = \frac{Kf(h)f(RPM)f(MAP)}{1+(f(F/A)-f(CAT))}$$

where K is a constant and $f$ means a function of the associated variable. For the purposes of the present invention the form of this equation may be:

$$IHP = K \cdot f(h) \cdot f(RPM) \cdot f(MAP) + IHP \cdot f(CAT) - IHP \cdot f(F/A)$$

Figure 1:
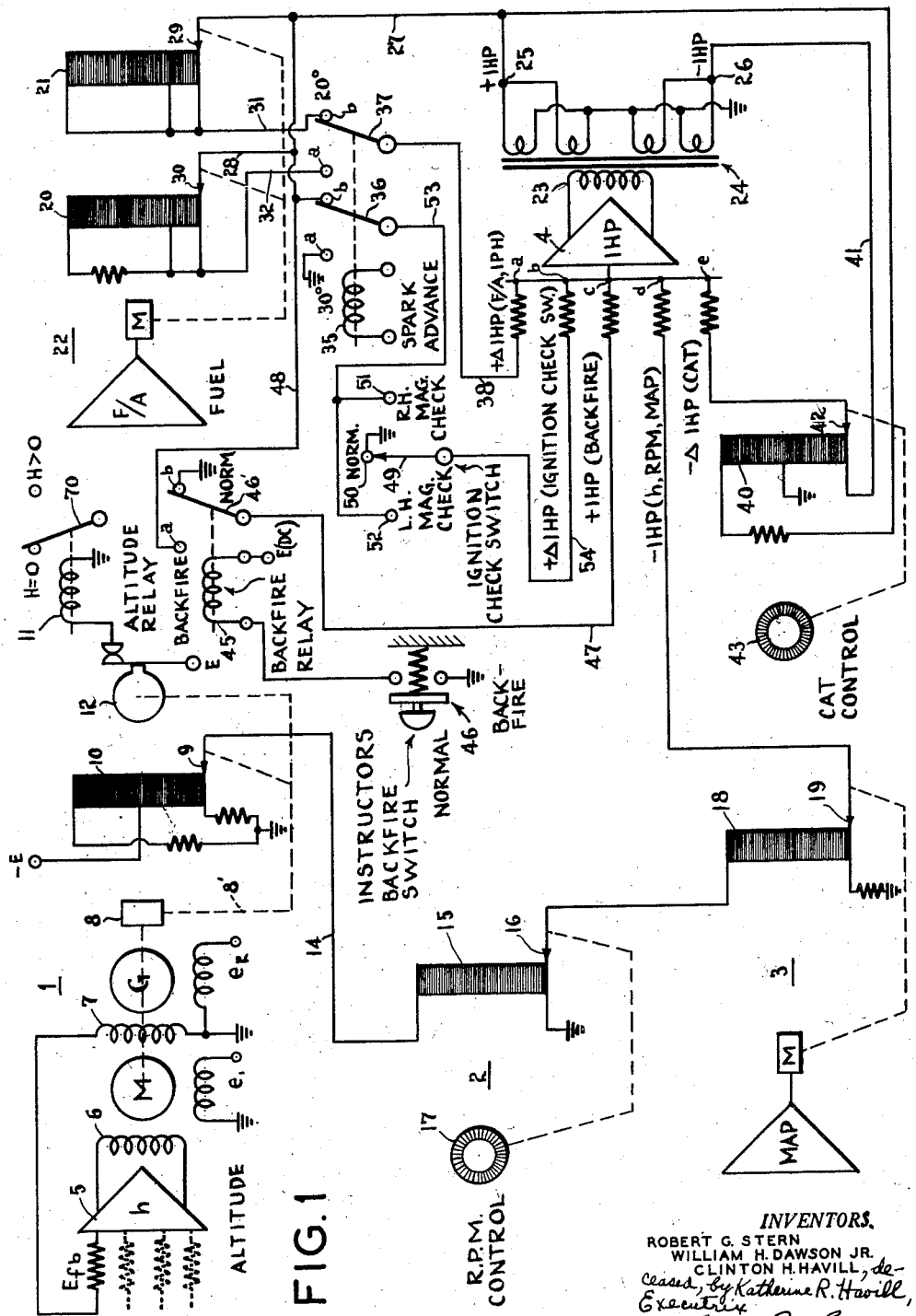

Referring now to Fig. 1 which shows in part the computing circuitry for determining IHP, the combined factor involving h, RPM and MAP is represented by a voltage that is the resultant of derived voltages from an altitude servo system 1, an RPM control (governor setting) 2 and MAP servo system 3. This resultant voltage is fed to the input terminal d of the IHP summing amplifier 4, the output of which is a control voltage representing IHP.

In order to avoid duplication of involved circuitry, the control circuits of certain computing servo systems and the like are omitted in the present application where such are shown in copending applications having the same assignee as the present invention. In Fig. 1, reference is made to application Ser. No. 134,623, now Patent No. 2,731,737, filed December 23, 1949 by Robert G. Stern for disclosure of a flight computing system including the altitude servo system; and to application Ser. No. 436,478, now Patent No. 2,808,658, filed on even date herewith by R. G. Stern and W. H. Dawson for "Simulated Manifold Pressure System for Aircraft."

In this application the servo systems are shown as of the electric motor type wherein the motor is energized according to a resultant computing signal voltage and is arranged to adjust one or more potentiometers for deriving other control signal voltages for the computing system; however, it will be understood that the present invention is not limited to a specific type of servo system and that known equivalent systems having generally the same functions may be used.

Referring again to Fig. 1, a description of the altitude servo system will be sufficient for this application as the other servos are generally similar and therefore can be shown diagrammatically. The $h$ servo summing amplifier 5 is energized by a number of signal voltages from the main computer system, such as disclosed in Ser. No. 134,623 above referred to. The output of the amplifier is the resultant of the input voltages representing components of vertical air speed and controls the motor M so as to represent integrated vertical air speed, i. e. altitude. The servomotor M is of the alternating current two-phase type, the control coil 6 of which is energized by the amplifier output voltage and the other coil by a reference A. C. voltage $e_1$. A generator G is connected to the motor and is also of the two-phase type for generating a feed-back voltage $E_{fb}$ for the servo amplifier. The other coil is energized by a constant reference voltage $e_2$. The motor through a mechanical connection including reduction gearing 8 positions the slider contact 9 of a potentiometer 10 for deriving at the contact a voltage depending on the representation of altitude. The operation of this type of motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage.

For obtaining the desired $h$ function voltages in accordance with the aircraft engine to be simulated, the potentiometer 10 is energized at the approximate midportion by a voltage $-E$ and is grounded at its opposite terminals through resistances as shown. The $h$ servo may also control the "altitude relay" 11 by means of a cam 12 that actuates a switch as shown so that the relay is energized only when the altitude is zero, i. e. ground level. A switch 70 actuated by the relay 11 is employed in the simulation of high fan horsepower at zero altitude as described with reference to Fig. 2.

The individual potentiometer resistance elements may be of the well-known wound card type and are of circular or band form but are diagrammatically illustrated in a plane development for clearness. Each potentiometer is shaped or contoured so that the value of the derived voltage at the potentiometer contact bears a certain relationship to the linear movement of the slider contact depending on the particular function of the potentiometer, and has a voltage impressed across its terminals depending in instantaneous polarity and magnitude also on the function of the potentiometer. According to the present invention the contour of all functional potentiometers represents the derivative of the function represented.

The $h$ voltage so derived at slider 9 is fed by lead 14 to the potentiometer 15 of the RPM control 2. The slider 16 thereof is positioned according to the adjustment of the RPM setting which is represented by a dial 17. The derived voltage at slider 16 now representing functions of $h$ and RPM is fed to the potentiometer 18 of the MAP system 3. Accordingly, the derived voltage at slider 19 represents the combined factor ($h$, RPM and MAP) in the equation above referred to and which is fed to the terminal $d$ of the IHP summing amplifier 4.

Another factor of the equation is represented as the input voltage at terminal $a$. This input is a correction factor representing a combined function of IHP and $F/A$ and is produced by combining the output of the IHP amplifier 4 and a function potentiometer 20 (or 21) of the $F/A$ servo system 22 for return input to the IHP amplifier. This is a typical method of applying a correction factor according to the present invention and may be applied to other systems where required. Specifically, the output of IHP amplifier 4 energizes the primary coil 23 of a transformer 24, the secondary winding of which is arranged to produce at terminals 25 and 26 voltages of opposite instantaneous polarity representing IHP. The voltage at terminal 25 is led by conductor 27 and conductor 28 to the slider contact 29 and 30 respectively of potentiometers 21 and 20 so that the respective derived voltages at the output conductors 31 and 32 varies in accordance with the positioning of the $F/A$ servo and the function characteristics of the cards 21 and 20. This increment IHP as a function of $F/A$ is dependent on the spark advance position and this is provided for as shown by the spark advance relay 35 hereinafter described. The relay is provided with switches 36 and 37 adapted to be moved between two positions, i. e. to the "$a$" contact representing 30° spark advance when the relay is energized, and to the "$b$" contact representing 20° spark advance when the relay is de-energized. In the position shown, the spark advance relay is de-energized so that the switch 37 engages its "$b$" contact for connecting the derived voltage from card 21 to the amplifier input lead 38 that is connected through a suitable proportioning resistance to amplifier input terminal $a$. It will therefore be seen that the function selected in the $F/A$ servo system depends on whether the flight engineer sets the spark advance at 20° or 30°.

Another input voltage representing increment IHP as a function of carburetor air temperature (CAT) is applied at the terminal $e$ of the IHP amplifier. This voltage is derived from the CAT card 40 that is in turn energized from terminal 26 of the IHP transformer through lead 41. The card 40 is energized by the IHP voltage at transformer terminal 25 also at the opposite terminal of the card which is grounded at its mid-portion to represent a reference temperature. The slider 42 is positioned by the CAT control illustrated for simplicity as a dial 43. The derived voltage at amplifier terminal $e$ represents the IHP (CAT) factor of the equation above referred to.

A signal voltage representing loss in IHP due to "backfire" is applied at the amplifier input terminal $c$. The circuitry for this signal is designed such that when the instructor energizes the back-fire relay 45 by pressing his back-fire push button switch 46, the IHP can be decreased as much as 50% depending on the length of time the switch is engaged. The back-fire relay has a switch 46' normally engaging its grounded "$b$" contact so that there is no signal voltage on input lead 47, terminal $c$. This represents the normal condition wherein IHP is not affected by back-fire. When the relay is energized to represent back-fire a voltage from the IHP transformer terminal 25 is fed by leads 27, 48, relay switch 46' and lead 47 to terminal $c$ for decreasing IHP. As the instructor's back-fire switch is held closed, there is a rapid decrease in IHP, and this decrease is transmitted to the brake horsepower (BHP) system presently described which in turn controls a torque system and indicator. However, due to the natural inertia or time lag of the BHP system tending to cause the torque system to respond relatively slowly to the IHP back-fire signal, the torque system is adapted to respond directly to a back-fire signal as hereinafter described, so that torque drops off realistically.

A final signal voltage for representing the effect of "ignition check" is applied at terminal $b$ of the IHP amplifier. This signal voltage corresponds to the loss in power when but one magneto of the dual-magneto system is used during the usual ignition check. The check switch 49 is normally at the grounded center contact 50 so that IHP is not affected. When the switch is thrown to either contact 51 or 52 representing right hand and left hand magneto check respectively, a signal voltage from IHP transformer terminal 25 is fed by conductor 27 and 48, spark advance relay switch 36 (on contact "$b$") conductor 53 through contact 51 or 52, as the case may be, switch 49 and lead 54 to the amplifier terminal $b$. It will be seen that a reduction in power occurs only when the spark advance is at 20°. At the 30° setting the relay switch 36 is grounded through its "$a$" contact thereby indicating no loss in power during ignition check.

Figure 2:
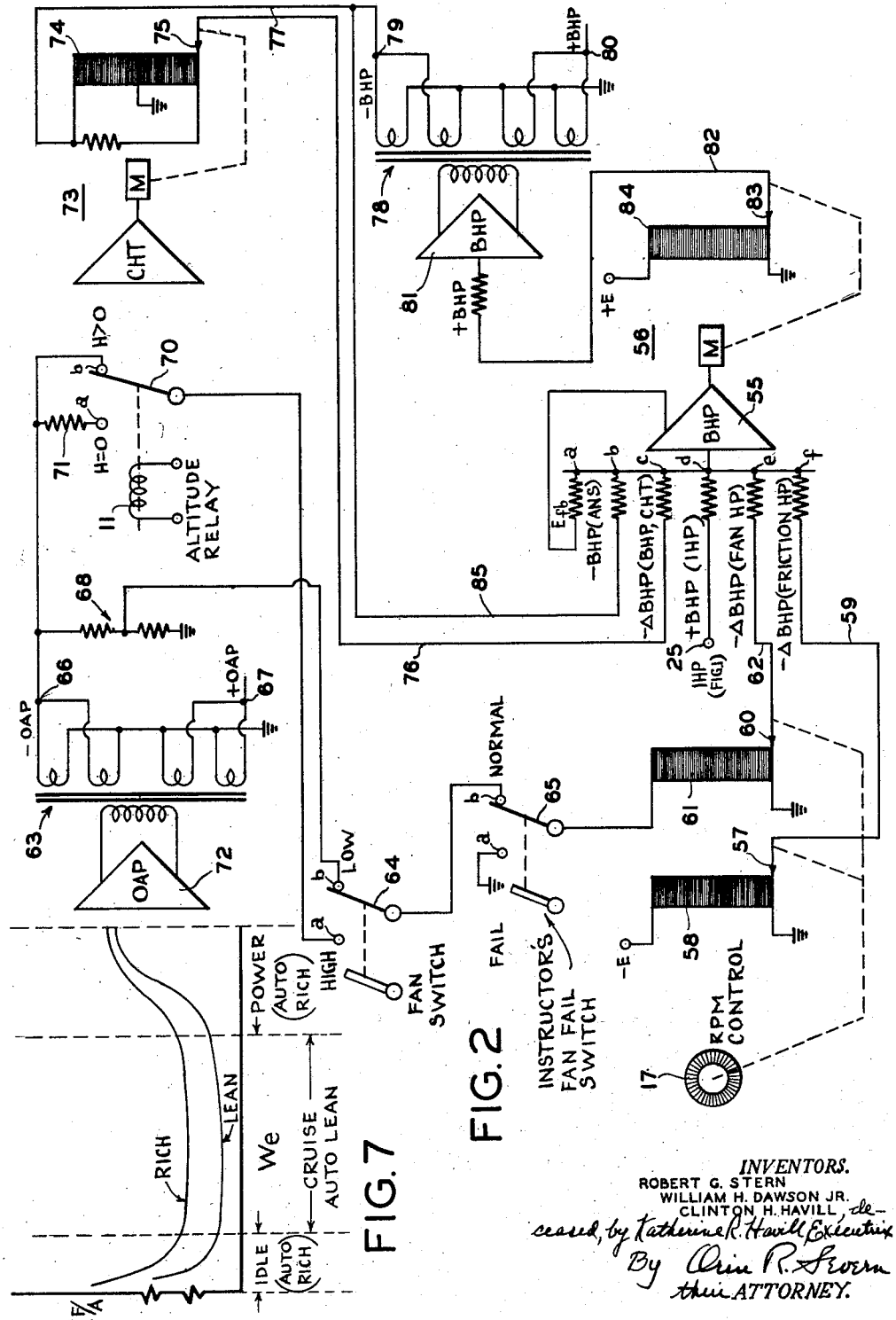
Fig. 2 is a similar illustration including the computation of brake horsepower (BHP)

The computing circuitry for brake horsepower (BHP)

is shown in Fig. 2. The main input signal for the BHP servo amplifier 55 represents the computed IHP of Fig. 1. This voltage is applied at terminal d of the BHP amplifier as indicated from the IHP transformer terminal 25 of Fig. 1. It will be noted that the IHP input is indicated as positive and that the other inputs (losses) are indicated as negative. That is, all other inputs subtract from IHP so that the resultant represents BHP. The BHP signal controls the BHP servo system generally indicated at 56.

The input signal representing friction horsepower, which also includes blower horsepower, is a function of R. P. M. This signal voltage is derived at slider contact 57 of the R. P. M. potentiometer 58 in accordance with adjustment of the R. P. M. control 17, and is applied by conductor 59 to the input terminal f of BHP amplifier 55. The R. P. M. card 58 is energized as indicated by a constant A. C. voltage —E.

Another BHP input signal represents the power required by the engine cooling fan. This signal is a function of both R. P. M. and outside air pressure (OAP) and is derived at slider 60 of the R. P. M. card 61 and fed by conductor 62 to the amplifier input terminal e. The card 61 is energized by a voltage from the OAP transformer 63 through the engineer's "fan" switch 64 and the instructor's fan fail switch 65. When the fan switch is on "low" at the "b" contact and the fan fail switch is on normal at its "b" contact, the R. P. M. card 61 is energized by a voltage from a voltage divider 68 that is connected to the OAP transformer terminal 66, and the switches 64 and 65. When the fan switch is on "high" at its "a" contact the card 61 is energized by a voltage from the transformer terminal 66 through the altitude relay switch 70. Assuming the aircraft to be airborne and the altitude relay de-energized, Fig. 1, the relay switch 70 engages its "b" contact to connect directly with OAP terminal 66. If the aircraft is at ground level, the relay is energized so that switch 70 engages its "a" contact to insert a resistance 71 in the circuit for purposes presently described. When the instructor's fail switch 65 is on "fail," the input circuit is grounded, thereby indicating absence of fan horsepower, so that available BHP at the propeller shaft is increased by that amount.

The OAP signal voltage is suitably derived according to altitude from a system including a summing amplifier 72 the output of which energizes the transformer 63 as shown for example in the aforesaid application S. N. 436,478 by Stern and Dawson.

In order to avoid more complicated circuitry in the simulation of fan horsepower above described, the calculations for the present invention were made so that low fan horsepower is computed accurately at low altitudes and high fan horsepower is computed accurately at the higher altitudes. This compromise was made in view of comomn practice to use "high fan" at the higher altitudes and to use "low fan" for the lower altitudes. However, one of the check points for fan operation when the aircraft is grounded is to shift momentarily to "high fan" and observe the drop in torque at the torque meter. In order to simulate correctly this torque drop when shifting to high fan at sea level, the signal voltage for fan horsepower is directed through the on-ground position of the altitude relay. When off the ground, the relay is de-energized and the signal voltage is picked up directly from the OAP transformer. This signal is several times greater than the "low fan" signal from the voltage divider 68. In the on-ground position of the altitude relay, this "high fan" signal voltage is directed to high resistor 71 which compensates for the inaccuracy of "high fan" computations for low altitudes, that is for zero altitude. This resistor is so calculated that the correct torque drop will be indicated for the ground check test described above.

Another negative power input is that of BHP as a function of cylinder head temperature (CHT). This signal input is applied at terminal c of the BHP input network. Although the effects of CHT on BHP in the airplane is a somewhat involved computation, the function in the present simulating apparatus of CHT is intended to represent a considerable loss in power for operation at either exceedingly low cylinder head temperatures or exceedingly high cylinder head temperatures. The effects of cylinder head temperatures within the normal operating range of CHT are very small. An example of the usefulness of the effects of CHT on BHP in the present invention is where a flight crew attempts to take off with the cylinder heads at a very low temperature such as before engine warm-up. The loss on take-off power would be appreciable and could result in a crash.

The above CHT signal is derived by joint operation of the BHP servo system 56 and the CHT servo system 73 in the following manner. The CHT card 74 is designed as indicated with an intermediate ground tap so as to represent the exceedingly high and low values of CHT above referred to. The card is energized by a voltage —BHP so that the derived voltage at slider 75, which is connected by lead 76 to terminal c represents the BHP input as a function of CHT. The card 74 is connected by lead 77 to a BHP transformer 78 at terminal 79. This transformer is energized by a BHP amplifier 81 connected by lead 82 to the slider 83 of the BHP card 84. This card is energized by a constant voltage +E so that the derived voltage at slider 83 represents BHP.

The BHP card 84 also is used to supply an answer signal voltage at the terminal b of the BHP input network. Since the BHP signal is used for a number of functions the amplifier 81 and its phasing transformer 78 are provided. The answer voltage is taken from the transformer terminal 79 by lead 85 to the BHP input network. A final input is the feed-back voltage from the servo amplifier 55 to the input terminal a. As above described, the algebraic summation of the input values represents BHP.

Figure 3:
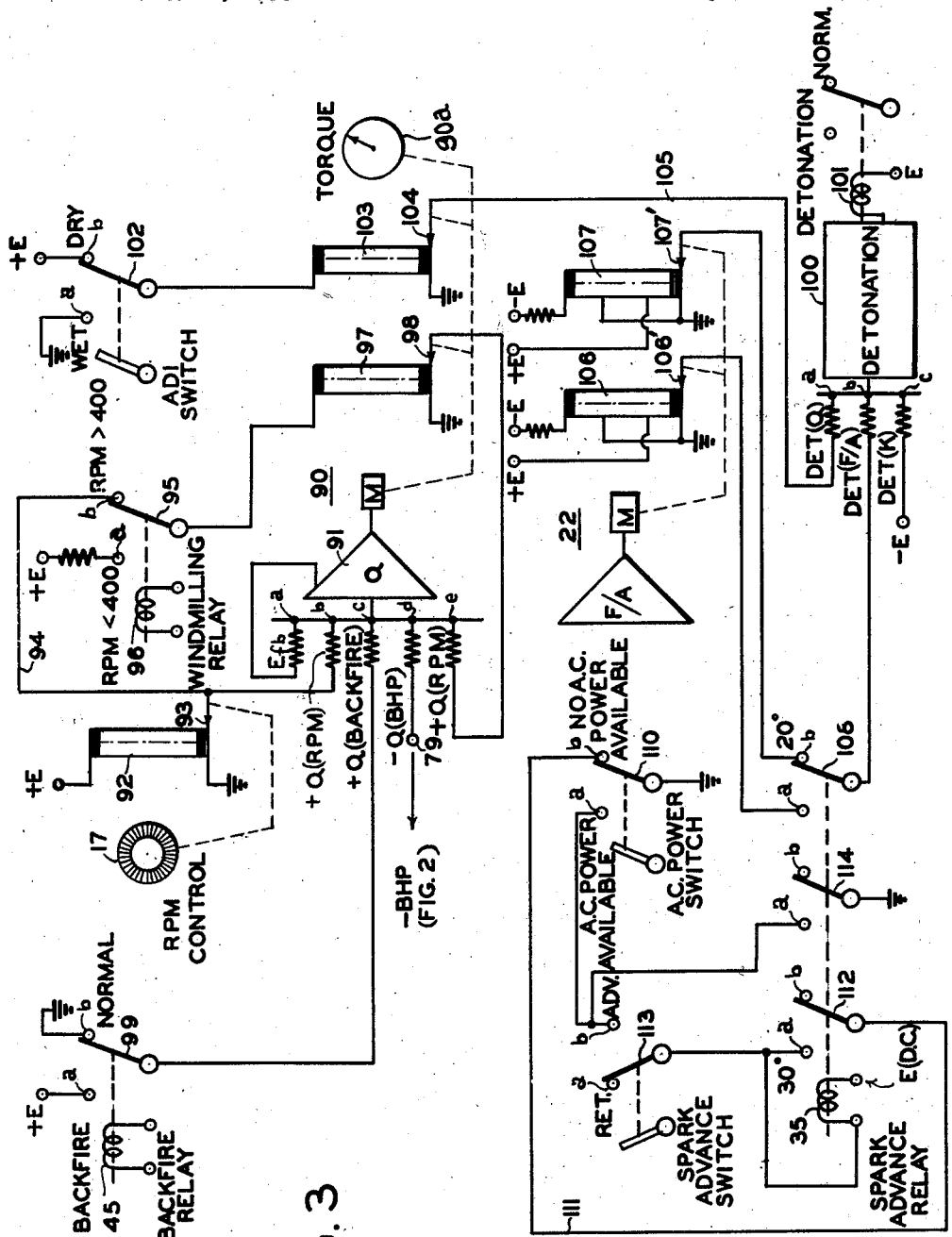
Fig. 3 is a similar illustration including the computation of torque (Q) and detonation conditions.

The system for computing torque (Q) is illustrated in Fig. 3. For the purposes of the present invention torque can be expressed in relation to R. P. M. and BHP as follows:

$$RPM \cdot Q = K \cdot BHP$$

where K is a constant. By applying voltage signals representing each side of this equation separately to the input network of the torque servo system 90 and in opposite sense, the servo will solve the equation in well known manner by positioning itself at a point representing torque. The signal voltage representing $K \cdot BHP$ is applied from the BHP summing amplifier, Fig. 2, directly to input terminal d of the torque servo input network at amplifier 91. The signal voltage representing RPM multiplied by Q of the equation is derived from the RPM control card 92, slider 93, lead 94 through the switch 95 ("b" contact) of the windmilling relay 96 to energize the torque servo card 97. The derived signal at slider 98 is applied at terminal e of the torque servo input network. When RPM is greater than 400 for example, this voltage is applied in the normal way described above through the relay 96. When RPM is less than 400, i. e. less than idling R. P. M., and the windmilling relay is energized, a constant voltage +E is applied through relay contact "a" to the card 97 so that the signal at terminal e is a function only of torque. This device is to prevent the torque servomotor from running against its maximum stop, if for some reason RPM should drop to zero while there was still some BHP signal at the input network. That is, if RPM were to be at zero, the answer voltage at terminal e would obviously be zero. Hence any BHP signal tending to increase torque would cause the servomotor to run to its maximum position. However, with the constant input voltage from the windmilling relay applied below 400 RPM, the torque servo will always return to zero position.

Another function affecting torque is "backfire." The signal representing backfire is applied at input terminal c through the backfire relay, Figure 1, at the relay switch 99. Under normal operation the backfire relay is de-energized and the input is grounded through the "b" contact. When the instructor presses his backfire switch the relay is energized to apply full signal voltage +E to the torque servo tending to run the servomotor toward zero. Obviously the decrease in torque depends on the length of time that the instructor holds the backfire switch closed. The aforesaid signal voltage is applied directly to the torque servo in order to simulate the fast response of the torque indicator to the backfire signal, thus eliminating any delay that might be caused by the BHP servo etc.

The RPM signal at input terminal b is concerned with the operation of the torque servo so that its lower position corresponds to a positive value of Q, such as 50 p. s. i. for example. That is, the effect of the RPM signal is simply to shift upwardly the zero position of the answer card 97. Finally, a feed-back signal from the amplifier 91 is fed to input terminal a of the network. Torque indicator 90a is positioned by the servo.

An important factor in the operation of aircraft engines is known as "detonation." Detonation is indicated by a critical rise in CHT and may be as a result of high power operation with incorrect fuel air mixtures. In the present invention detonation is simulated by means of an electronic relay 100 such as a thyratron, Fig. 3, that is adapted to "fire" under pre-determined conditions representing detonation to energize a relay 101. This relay controls input signals for the CHT servo system, Fig. 6, as hereinafter described, so as to represent the effect of detonation on cylinder head temperature indication. The circuitry illustrated in Fig. 3 is for simulating detonation only as a result of high power, incorrect fuel-air operation. The thyratron operates on the principle of balancing the actual operating torque Q, which is represented by a signal voltage at the thyratron input terminal a, against the detonation torque as a function of fuel-air ratio for both 20° and 30° spark advance which is represented as the signal at the input terminal b. A constant signal input −E is applied at input terminal c to provide for potentiometer design for the detonation functions on the fuel-air servo 22. The equivalent of this constant is included in the detonation signal at terminal b of opposite sense; hence the two are cancelled.

The thyratron 100 is designed to fire on a positive voltage signal. Therefore when the actual torque signal at terminal a exceeds the detonation torque signal as a function of F/A, i. e. the negative signal applied at terminal b, the thyratron will fire with resultant detonation indication. The signal voltage for actual operating torque originates at the "anti-detonation injection" (ADI) switch 102. If the ADI switch is at "wet" operating position at contact "a", i. e. water injection, the signal input circuit is grounded and hence the thyratron cannot fire. This simulates the condition wherein no detonation occurs when water injection is being used. However, for "dry" operation a voltage +E is applied at the card 103 of the torque servo system and a signal voltage is derived at slider 104 that is led by conductor 105 to terminal a of the thyratron representing actual operating torque.

The positive voltage input for detontation torque (F/A) originates at the fuel-air servo 22. There are two function cars 106 and 107 in the F/A servo, card 107 representing torque detonation values for 20° spark advance and card 106 representing torque detonation values for 30° spark advance. Either of these values is selected by the spark advance relay 35 at its switch 108. When the relay is energized, a 30° spark advance function signal from the F/A function card 106 is connected through the relay "a" contact to the input terminal b of the thyratron. When the relay is de-energized at the 20° spark advance, the corresponding F/A function applied to the thyratron terminal b through the relay "b" contact. In general, the function cards 106 and 107 are designed so that the fuel-air mixture where detonation is most apt to occur is a practical value, such as approximately .066. Since this figure is normally a safe operating range for cruise powers it is very easy in practice for the flight crew to exceed cruise powers, and if this is done a detonation range is entered. This detonation range extends to a much lower point for a 30° spark advance. It is particularly easy in certain aircraft for the flight crew to enter this detonation range while "leaning," i. e., reducing the fuel-air mixture, to the best economy point in 30° spark advance. This feature is simulated by the above circuitry, and unless the exact procedure outlined in the pilot's manual for leaning to best economy with 30° spark advance is followed, the present system will sense the errors and result in simulated detonation. Accordingly, the apparatus of the present invention provides excellent training for flight crews on long range operations when "leaning" with advanced spark is used.

The control of the spark advance relay shown in Fig. 3 simulates the operation of a motor operated control for example that fails "in position" upon failure of the voltage supply. In the present case, if the spark advance relay is in the 30° position at the time when power fails it will remain in such position regardless of movement of the spark advance switch by the flight engineer to 20° position. Similarly if the relay is at 20° at the time of power failure it will remain in the retarded position regardless of operation of the spark advance switch.

Assuming now that the relay 35 is energized and at the advanced 30° position and that the simulated A. C. power switch 110 is in the no-power position shown, the relay 35 will be held in position by an energizing circuit including the grounded power switch 110, its "b" contact, lead 111, spark advance relay switch 112 and its "a" contact that is connected to the relay coil in turn connected to an energizing source E (D. C.). It will be apparent that throwing the spark advance switch 113 to either position does not affect the aforesaid holding circuit.

Let it now be assumed that the relay is de-energized in the retarded 20° position and that power failure is simulated. The relay 35 remains in open position in the absence of an energizing circuit. That is, the spark advance switch 113 is prevented from closing the relay as the switches 110, 112 and 114 are all open at their "b" contacts; hence no energizing circuit is available for the relay. When the power switch 110 is moved to "power available" position at its contact "a" an energizing circuit is reestablished through the spark advance switch 113, contact "b," to the relay 35.

The above described holding circuit arrangement is an inexpensive and accurate method of simulating the operation of any control member that is operated by an electric motor that is in turn switch controlled.

Figure 4:
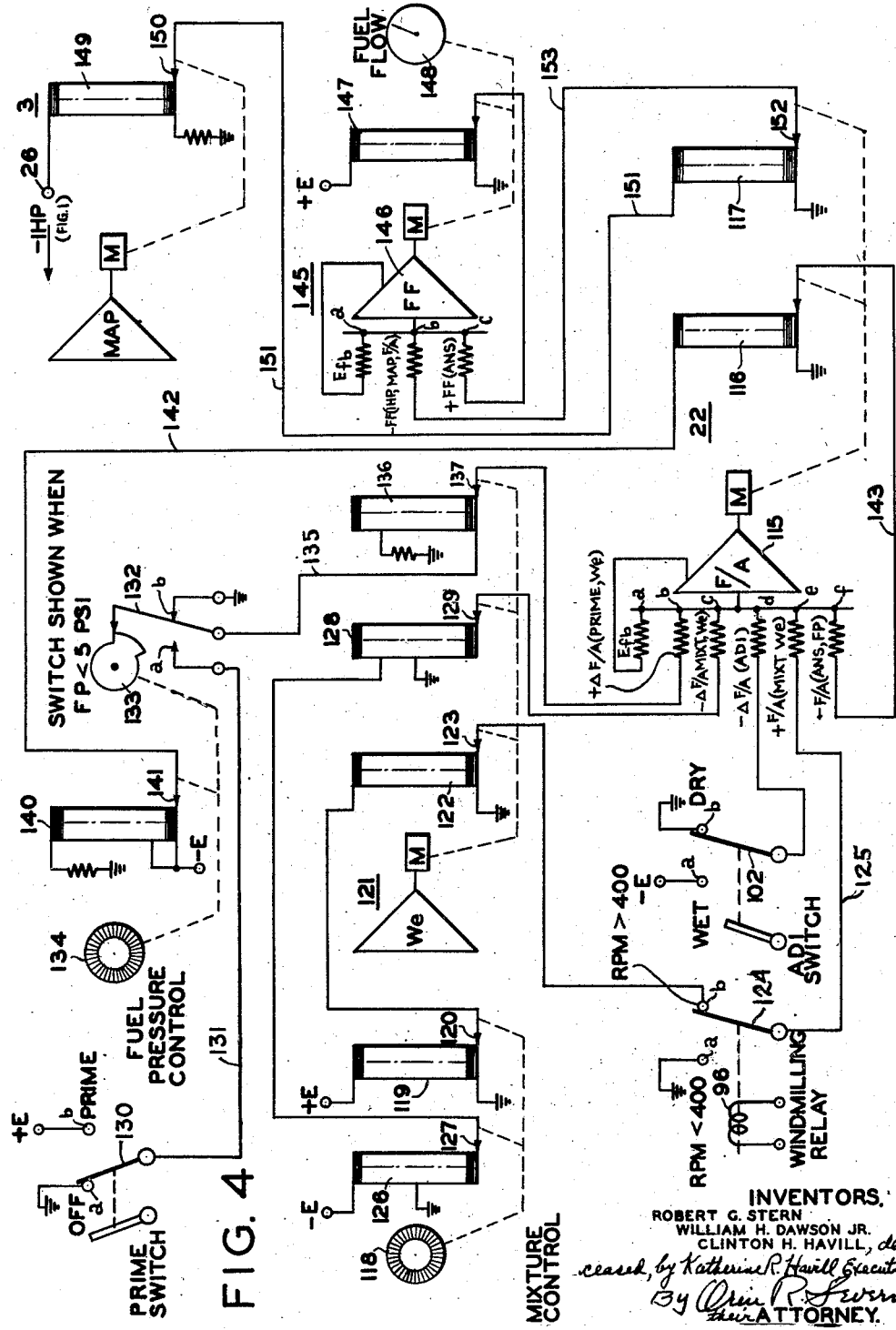
Fig. 4 is a similar illustration including the computation of fuel-air ratio (F/A) and fuel flow (FF)

The circuitry, including the F/A servo system 22 for computing F/A is shown in Fig. 4. The fuel air ratio is primarily a function of the weight of engine air flow and the position of the flight engineer mixture control member. The F/A servo system 22 comprises a summing amplifier 115 having its input side connected to a network for applying the respective computing signal voltages, a servomotor M as in the previous servo systems and associated function potentiometer 116 and 117 adjustable by the motor.

The basic fuel air signal voltage is applied at the input terminal e of the network. This signal is a function of the position of the mixture control 118 and the weight of engine air flow ($W_e$). This function is graphically illustrated by Fig. 7 which represents the basic carburetor metering curve. The signal originates at the card 119 associated with the mixture control 118. The card is energized by a constant voltage +E and the derived voltage at slider 120 is fed to the $W_e$ servo system 121 hereinafter described, for energizing $W_e$ card 122 from which a derived voltage at slider 123 is fed through switch 124, contact "b" of the windmilling relay 96, and lead 125 to the F/A input terminal e. It will be noted that when RPM is represented as less than 400 the windmilling relay grounds input terminal e through the relay switch 124, thereby representing zero F/A which is the condition for such low RPM.

In order accurately to simulate the carburetor metering curve, another signal voltage that is also a function of the mixture control position and $W_e$ is derived in similar manner and fed to terminal c of the input network. This signal, termed a delta function, serves to bring the rich and normal fuel air ratios together at high air flows such as at take-off for example as illustrated in Fig. 7. This delta function signal also originates at the mixture control, card 126, energized by a constant voltage —E. The derived voltage at slider 127 is fed to the $W_e$ card 128 from which a derived voltage at slider 129 is fed directly to the terminal c of the input network. The $W_e$ card 128 is designed as above stated to correlate the rich and normal fuel air ratios as illustrated in Fig. 7.

A supplementary F/A signal comes from the engineer's primer switch 130 and is fed to terminal b of the input network. This function is intended primarily to provide a fuel-air signal for engine starting. However, the primer may also be used for emergency operation and for determining best power mixture position under certain conditions. Primer fuel-air is available if D.-C. power has not failed, if the primer circuit breaker is not open, and if the fuel pressure is greater than 5 p. s. i. Primer fuel-air ratio will decrease as the engine air flow increases. This is true because "prime" represents a constant fuel flow and hence, if the air flow increases the fuel-air ratio will decrease. Because of this there is a limitation as to how high an air flow can be used when running on prime only since the engine will "cut-out" below .050 fuel-air ratio.

When "prime" is used, the signal originates at the prime switch 130, source +E, and is fed by lead 131 to the cam operated switch 132 that is positioned by cam 133 of the fuel pressure control 134 so that the "a" contact is engaged when fuel pressure (FP) is greater than 5 p. s. i., and the "b" contact (grounded) is engaged when the fuel pressure is less than 5 p. s. i. for example. The FP switch 132 is connected by lead 135 to the $W_e$ card 136 and the derived voltage at slider 137 is fed directly to the terminal b of the input network. It will be noted that this input is grounded when the prime switch is "off" or when the FP switch indicates less than 5 p. s. i. fuel pressure.

Another input signal is fed to the F/A input terminal d from the ADI switch 102. When this switch is in the "wet" position, the fuel-air ratio is decreased about .022, this decrease being simulated by the signal from the source —E. This decrease in fuel-air ratio provides optimum power fuel-air ratio during take-off power operation. When the ADI switch engages its "b" contact, i. e. dry operation, this input circuit is grounded so that no signal is present.

Another F/A input signal represents a decrease in normal F/A for a decrease in normal fuel pressure. This signal is fed to the F/A input terminal f through a reciprocal function card 140 of the fuel pressure control in combination with F/A card 116 to provide a decrease in normal F/A for a decrease in normal FP. If the fuel pressure goes to zero for some reason, a fuel-air ratio also will go to zero. At some point the zero and normal 25 p. s. i. fuel pressure, the F/A will be less than .050 and the engine will automatically cut-out. This signal originates at the FP reciprocal card 140, source —E, and the derived voltage at slider 141 is fed by lead 142 to the F/A card 116 from which a derived voltage corresponding to the above function is fed to input terminal f.

It will be noted that this is an alternative arrangement for decreasing F/A upon lowering of fuel pressure, referring to the FP cam operated switch 132. A conventional feed-back signal from the F/A amplifier 115 is fed to input terminal a.

The fuel flow (FF) computing and indicating system is also shown in Fig. 4. Fuel flow is the product of engine air flow and fuel-air ratio and can be expressed by the equation:

$$FF = IHP \cdot f(MAP) \cdot F/A$$

The FF servo system 145 comprises a summing amplifier 146, servomotor M, an answer card 147 and a fuel flow indicator 148, both connected to the servomotor which is positioned according to the main input signal at terminal b representing fuel flow. This signal originates at the IHP summing amplifier, Fig. 1, and a signal voltage —IHP from IHP transformer at terminal 26 is applied to MAP card 149. The derived voltage at slider 150 is fed by conductor 151 to the F/A card 117 from which a derived voltage at slider 152 is fed by conductor 153 to the FF input terminal b. The answer voltage +FF is fed from card 147 to input terminal c and a feed-back signal from the amplifier 146 is fed to input terminal a. Accordingly, the FF servo will position itself according to the resultant of the signals represented in the above formula to indicate fuel flow. For training purposes, the instructor has indirect control of fuel flow by use of the fuel air control. This is considered satisfactory simulation since most fuel flow errors are a result of F/A variations such as faulty carburetor metering, low fuel pressure etc.

Figure 5:
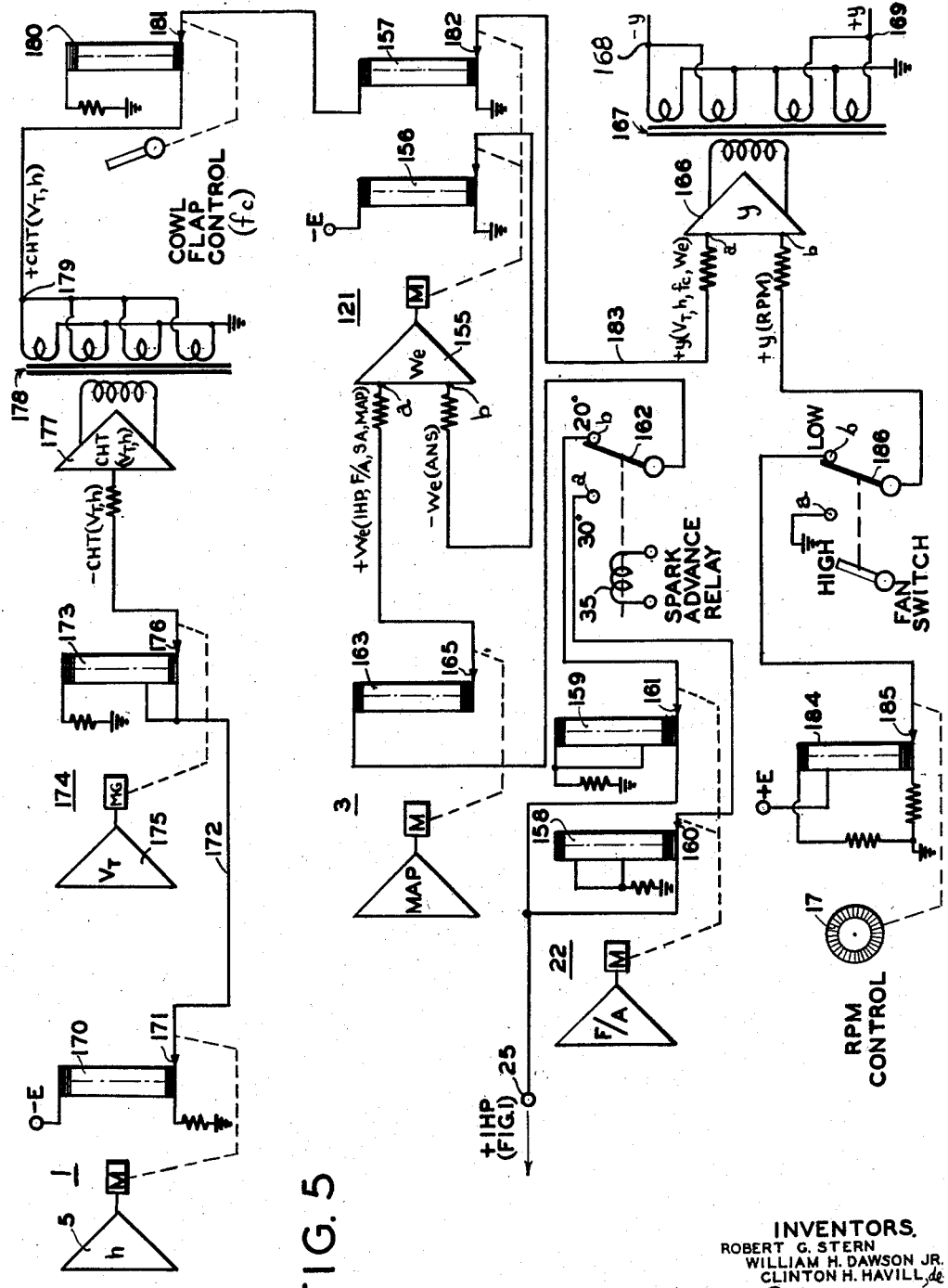
Fig. 5 is a similar illustration including the computation of engine air flow (We), cylinder head temperature (CHT) and a computing factor (y)

The computing circuit for the engine air flow system, including the $W_e$ servo system 121, is shown in Fig. 5. The mass air flow or weight of air consumed by the engine is roughly a measurement of IHP (power developed within the cylinders). It does, however, vary from a straight line function with pressure and fuel-air mixture. For a given weight air flow the amount of power obtained from the air is dependent on the amount of fuel mixed with this air, i. e. the fuel-air ratio. For example, at extremely lean mixtures of fuel-air a considerable increase in airflow is required to obtain the same IHP that would be obtained at the richer fuel-air ratios, such as best power fuel-air mixture. MAP represents the inlet pressure to the cylinders and hence is a proportionate measurement of IMEP (Indicated Means Effective Pressure) for any RPM. Hence, airflow will increase for any given IHP which is obtained at a higher MAP required to maintain IHP constant as a result of, say, decrease in engine RPM. The equation for mass airflow therefore may be expressed as:

$$W_e = IHP \cdot f(F/A) \cdot f(MAP)$$

The signal voltage corresponding to the resultant of these factors is applied at the input terminal a of the $W_e$ servo amplifier 155. The $W_e$ servo includes a servomotor M for controlling an answer card 156 and a function card 157 hereinafter referred to. The basic $W_e$ signals originates at the IHP summing amplifier 4, Fig. 1, a voltage from the IHP transformer terminal 25 (+IHP) being applied to the function cards 158 and 159 of the F/A servo system 22. The derived voltages at sliders 160 and 161 respectively are applied to the "a" and "b" contacts of the spark advance relay switch 162. The switch is connected directly to the MAP servo card 163 by lead 164 and the derived voltage at slider 165 representing the aforesaid $W_e$ signal is fed to the $W_e$ input terminal a. There are two functions involved in the F/A system, one for 20° spark advance and the other for 30° spark advance so that the $W_e$ signal voltage corresponds to the correct function to operation of the spark advance relay 35. As shown, the spark advance relay switch 162 connects the $W_e$ input to the corresponding function potentiometer 158 or 159 of the F/A servo system. The derived voltage from the $W_e$ answer card 156 is fed to input terminal b for positioning the servo according to the simulated weight of engine airflow.

A computing factor termed "y" that is used primarily in the computation of CHT, Fig. 6, and that involves a number of factors including RPM, altitude, true air speed, cowl flap position and weight of engine airflow is represented by a signal voltage produced as illustrated in Fig. 5. This y factor is represented by the y summing amplifier 166 having input terminals a and b for the computor signals. The output of the amplifier energizes a transformer 167 for producing at the secondary terminals 168 and 169 voltages of opposite sense representing factor y. The signal at the y amplifier input terminal a involves the factors $V_T$ (true air speed), $h$, $W_e$ and cowl flap position and originates as shown at the card 170 of the altitude servo system 1. This card is energized by a constant voltage $-E$ and the derived voltage at slider 171 is fed by conductor 172 to the function card 173 of the true air speed servo system 174 ($V_T$). This servo system includes a servo amplifier 175 and a motor-generator set as indicated for adjusting the card 173. The amplifier is energized from the main flight computing system as shown for example in the aforesaid application S. N. 134,623. The derived voltage at the slider 176 of the $V_T$ function card represents function of $h$ and $V_T$ and is fed to the amplifier 177, the output of which energizes a transformer 178 having a secondary terminal 179 with signal voltage of positive sense thereon. The terminal 179 is connected to the card 180 that is adjustable by the cowl flap control as indicated, and the derived voltage at slider 181 is fed to the $W_e$ card 157 from which the derived voltage at slider 182 is fed by lead 183 to the input terminal a of the y amplifier. This signal voltage therefore represents function of $h$, $V_T$, cowl flap position and $W_e$ as previously stated.

The signal at input terminal b originates at the function card 184 of the RPM control 17. This card is energized by a constant voltage $+E$ and the derived voltage at slider 185 is fed to the "b" contact representing the "low fan" position of the cooling fan switch 186, the switch being connected directly to the input terminal b. In the "high fan" position the fan switch engages its grounded contact "a" so that the input is grounded and RPM is not a factor. The resultant of the signals at inputs a and b represents the so called y computing factor above referred to.

The circuitry for computing simulated cylinder head temperature (CHT) is shown in Fig. 6. In accordance with the present invention the design of the CHT computing system is based on equation:

$$CHT + YCHT = Ytg + OAT$$

where OAT is the outside air temperature.

The factor y, Fig. 5, is determined as a function of air density, true air speed, cowl flap position and engine weight airflow. When low cooling fan is being used an RPM function is added to the y value. The factor $tg$ is equal to the combustion gas temperature and is therefore a function of F/A. The equation for y may be expressed as:

$$Y = \frac{CHT - OAT}{tg - CHT}$$

or the ratio of coefficients of heat transfer of heat entering the cylinder walls for combustion to heat leaving the cylinders for cooling.

Referring specifically to Fig. 6, the CHT servo system 73 is energized by signal voltages representing factors of the main equation for the CHT computing system so as to equate both sides of the equation and position the servomotor at a point representing CHT in accordance with well-known servo practice. The voltages representing the opposite sides of the equation are of opposite sense, hence the CHT servo will position to solve the equation. The CHT servo system, as in the previous servos, comprises a servo summing amplifier 190 and a servomotor M for adjusting the function potentiometers 191 and 192. The servomotor also positions an indicator 193 representing cylinder head temperature. The input side of the CHT amplifier 190 is connected to a network as indicated for a applying the respective signal voltages representing parts of the above equation.

A pair of signal voltages, namely one representing y CHT and the other representing CHT, are fed respectively to the amplifier input terminals b and h, these signals being dervied from the CHT answer cards 191 and 192 at sliders 194 and 195 respectively. The y CHT signal at terminal b originates at the y summing amplifier, Fig. 5, and the card 191 is energized by a voltage $-y$ from the terminal 168 of the y transformer secondary. The derived voltage at slider 194 is fed by lead 196 to the input terminal b. The CHT signal at terminal h originates at the switch 197, source $-E$, of the spark advance relay. Assuming the relay to be in the 20° position shown, the switch 197 connects the constant voltage $-E$ through "b" contact and conductor 198 to the CHT card 192. For a 30° spark advance, the card 192 is connected as indicated through a resistance 199, conductor 200 and the "a" contact to the source $-E$. It will be noted that the input signals at terminals b and h are both negative in sense. All other inputs are of opposite sense and balance the aforesaid pair of inputs when the servo positions itself.

An input signal representing y $tg$ is fed to input terminal c and also has its origin at the y summing amplifier, Fig. 5, the voltage $+y$ at the transformer secondary terminal 169 being applied by lead 201 directly to the function card 202 of the F/A servo system 22, and also through the ADI switch 203 and lead 204 to the function card 205 of the F/A servo. In the dry position shown of the ADI switch, the signal $+y$ is applied to the card 205 through a resistance 206, and in the "wet" position at contact "a" an additional resistance 207 is inserted in circuit. The derived voltages from cards 205 and 202 are connected by leads 208 and 209 to the "b" and "a" contact of the spark advance relay switch 210 which is connected by lead 211 to the input terminal c. Since the combustion gas temperature varies with spark advance there will be as indicated above two values for y $tg$, i. e. signal voltages from the respective F/A function cards, depending on whether the spark advance is set at 20° or 30°.

Another signal voltage representing a function of outside air temperature (OAT) is applied at the input terminal e. This signal originates at an OAT amplifier indicated at 212. A system for computing OAT as a function of altitude is disclosed in the aforesaid application S. N. 436,478 by Stern and Dawson. The OAT signal is fed from amplifier 212 by lead 213 to the CHT input terminal e. Accordingly, it will be seen that the two pairs of signals above identified, i. e., CHT and y CHT on the one hand and y $tg$ and OAT on the other, complete the main CHT equation. Therefore when the engine is "off" for example CHT will be equal to OAT as the y inputs for the servo are zero.

The other CHT inputs concern the engine cooling fan and detonation. The cooling fan signal is applied at the input terminal f and originates at the fan fail switch 214. In the normal position, the switch 214 engages its "b" contact as illustrated to ground the input circuit; however, in the "fail" position the switch 214 engages its "a" contact, source $+E$, to apply a voltage to terminal f sufficiently large to run the CHT servo to its maximum limit upon simulated fan failure, thereby representing overheating of the engine.

The detonation signals are applied at the input terminals d and g respectively. Each signal represents an increase in CHT as a result of detonation. The input at terminal d is a result of high Q and CAT detonation and the signal at terminal g represents detonation as a result of high power operation with dangerously low F/A mixtures. That is, detonation as a result of improper CAT operation is not dependent on the thyratron, Fig. 3, but is computed by separate circuitry and applied directly to the CHT input network, terminal d. The source of the signal voltage representing CAT detonation is at the ADI switch 215. In the "dry" position the switch is connected to a source +E through its "b" contact and in the "wet" position the switch is on its grounded "a" contact, thereby indicating absence of detonation. The ADI switch 215 is connected by lead 216 to the Q card 217 of the Q servo 90. The derived voltage at slider 218 is fed by lead 219 to a pair of CAT function cards 220 and 221 from which the derived signals at sliders 222 and 223 are fed to the "a" and "b" contacts respectively of the spark advance relay switch 224. This switch is connected directly by lead 225 to the CHT input terminal d. It will therefore be seen that when the ADI relay is de-energized (dry position) the signal voltage for detonation then becomes a function of CAT and Q, the magnitude of the signal further depending on whether the spark advance relay is at 20° or 30° spark advance. Generally, the amount of increase in CHT is dependent on torque and CAT, the higher the torque and CAT the greater will be the detonation signal increase to the CHT servo system. Accordingly it is possible to operate at very low torque and high CAT with only a slight increase in CHT. This simulates the distinction between light detonation and heavy detonation.

As above indicated, there are two functions for CAT, one for 20° and the other for 30° spark advance. For 20° spark advance, it is safe to operate at CAT up to approximately 39° C. Above this temperature detonation is introduced and the higher above this temperature the greater is the input signal to the CHT servo, i. e. the heavier is the detonation. For 30° spark advance detonation is introduced at approximately any temperature above 22° C. Similarly, temperatures above 22° C. represent continually increasing value of CHT. This is accomplished by the two function cards 220 and 221 of the CAT control which derive detonation signal voltages for selection at the spark advance relay switch 224 as above described.

The detonation signal determined by operation of the thyratron 100, Fig. 3, originates at the thyratron relay switch 226 and is fed by lead 227 to the CHT input terminal g. As described in connection with Fig. 3, the thyratron 100 is controlled in accordance with operation of the F/A servo system 22, function cards 106 and 107, and the spark advance relay switch 108. When the thyratron is fired to indicate detonation, the relay 101 is energized in the switch 226, Fig. 6, is connected to the source +E through its "a" contact. Accordingly a signal voltage is fed to input terminal g tending to increase CHT. When the thyratron is de-energized, i. e. normal operation, the switch 226 engages its grounded "b" contact so that no signal is applied.

Summarizing, operation in the high CHT range causes detonation within the engine cylinders. The actual increase in CHT as a result of operation in the high CHT range is simulated by means of the CHT servo answer card 192 which limits the maximum answer signal at input terminal h to 230° C. for 30° spark advance, and 260° C. for 20° spark advance. Since these answer voltages are limited to the above values, the CHT servomotor will run to its maximum stop at 300° C. where the sum of the other input signals to the CHT servo amplifier exceeds the above values. This will hold true because there is no effective additional answer voltage available for balancing the servo system against the excess voltage summed up at the input network. Hence, even a small voltage above the aforesaid values of answer voltage will prevent the servo from positioning itself and instead will cause it to run up to its upper stop.

In the interest of simplicity lamp signal circuits and the like to the instructor's station have been omitted from the disclosure. However, such circuitry is well-known and by way of example the instructor's station may be provided with a signal lamp for indicating detonation, such as in response to firing of the thyratron and/or high CAT operation. Other refinements may obviously be introduced within the scope of the present invention, such as the use of sound effects as when the instructor closes his backfire switch, etc.

The control voltages for operating the training apparatus of the present invention are alternating current voltages, except where otherwise indicated. The instantaneous polarity of the signal voltage where indicated refers to the phase relation with respect to a reference A. C. voltage. It will be understood however that the present invention is not limited to alternating current circuitry and apparatus and that a D. C. system may be used if desired.

The function potentiometers shown uniformly herein for convenience are not necessarily uniformly wound and may of course be suitably contoured, or have variable resistance characteristics, to correspond with the specific functions or engine characteristics to be simulated.

It should be understood that this invention is not limited to specific details of construction and arrangement thereof herein illustrated, and that changes and modifications may occur to one skilled in the art without departing from the spirit of the invention.

What is claimed is:

1. In ground-based training apparatus for aircraft personnel, means for simulating engine operation comprising computing means operable according to simulated flight and engine conditions, and indicating means responsive to said computing means for representing manifestations of engine operation, said computing means including means representing mixture control for deriving a control signal, means representing mass airflow for deriving another control signal, and an electrical system responsive to the aforesaid combined control signals as functions of mixture control and mass airflow for computing engine fuel-air ratio.

2. In ground-based training apparatus for aircraft personnel, means for simulating engine operation comprising electrical computing means operable according to simulated flight and engine conditions, and indicating means responsive to said computing means for representing manifestations of engine operation, said computing means including means representing mixture control for deriving a control signal, means representing mass airflow for deriving another control signal, and an electrical system responsive to the aforesaid combined control signals as functions of mixture control and mass airflow for computing engine fuel-air ratio, said electrical system being adapted in turn to derive electrical control signals as functions of fuel-air ratio for input to said computing means for determining other simulated engine conditions.

3. In ground-based training apparatus for aircraft personnel, means for simulating engine operation comprising electrical computing means operable according to simulated flight and engine conditions, and indicating means responsive to said computing means for representing manifestations of engine operation, said computing means including means representing fuel pressure control for deriving a control signal, means representing mixture control for deriving another control signal, means representing mass airflow for deriving another control signal, and an electrical system responsive to the aforesaid combined control signals as functions of fuel pressure, mixture control and mass airflow for computing engine fuel-air ratio.

4. In ground-based training apparatus for aircraft personnel, means for simulating engine operation comprising electrical computing means operable according to simulated flight and engine conditions, and indicating means responsive to said computing means for representing manifestations of engine operation, said computing means including means representing fuel pressure control for deriving a control signal, means representing mixture control for deriving another control signal, means representing mass airflow for deriving another control signal, an electrical servo system responsive to the aforesaid combined control signals as functions of fuel pressure, mixture control and mass airflow for computing engine fuel-air ratio and for deriving other control signals representing functions of fuel-air ratio for input to said computing means for determining other simulated engine conditions, and control means representing engine prime and anti-detonation-injection respectively for modifying the operation of said electrical servo system.

5. In ground-based training apparatus for aircraft personnel, means for simulating engine operation comprising electrical computing means operable according to simulated flight and engine conditions, and indicating means responsive to said computing means for representing manifestations of engine operation, said computing means including means adjustable according to fuel pressure control for deriving a control signal, means adjustable according to mixture control for deriving another control signal, means adjustable according to simulated mass airflow for deriving another control signal, and an electrical servo system responsive to the aforesaid combined control signals as functions of fuel pressure, mixture control and mass airflow for computing engine fuel-air ratio, said servo system having means for deriving voltages as functions of fuel-air ratio for input to said computing means for the computation of other simulated engine conditions including fuel flow.

6. In ground-based training apparatus for aircraft personnel, means for simulating engine operation comprising electrical computing means operable according to simulated flight and engine conditions and indicating means responsible to said computing means for representing manifestations of engine operation, said computing means including means adapted to derive control signals as functions of fuel-air ratio, means for deriving other control signals representing functions of engine horsepower, means for deriving other control signals representing functions of manifold air pressure, and an electrical system responsive to the combined aforesaid control signals for computing simulated mass airflow, said electrical system having means for deriving electrical control signals as functions of mass airflow for input to said computing means for determining other simulated engine conditions.

7. In ground-based training apparatus for aircraft personnel, means for simulating engine operation comprising electrical computing means operable according to simulated flight and engine conditions and indicating means responsive to said computing means for representing manifestations of engine operation, said computing means including an electrical system representing fuel-air ratio adapted to derive control signals as functions of fuel-air ratio, another electrical system for deriving other control signals representing functions of engine horsepower, another electrical system for deriving other control signals representing functions of manifold air pressure, and another electrical system responsive to the combined aforesaid control signals for computing simulated mass airflow, said last-named system having means for deriving electrical control signals as functions of mass airflow for input to said computing means for determining other simulated engine conditions including cylinder head temperature.

8. In ground-based training apparatus for aircraft personnel, means for simulating engine operation comprising electrical computing means operable according to simulated flight and engine conditions and indicating means responsive to said computing means for representing manifestations of engine operation, said computing means including means adapted to derive control signals as functions of fuel-air ratio, means for deriving other control signals representing functions of engine horsepower, means for deriving other control signals representing functions of manifold air pressure, an electrical system responsive to the combined aforesaid control signals for computing simulated mass airflow, said electrical system having means for deriving electrical control signals as functions of mass airflow for input to said computing means for determining other simulated engine conditions including fuel-air ratio and cylinder head temperature, and means operable according to simulated spark advance for modifying the effect of the aforesaid control signals in the computation of mass airflow.

9. In ground-based training apparatus for aircraft personnel, means for simulating engine operation comprising electrical computing means operable according to simulated flight and engine conditions and indicating means responsive to said computing means for representing manifestations of engine operation, said computing means including an electrical system representing fuel-air ratio adapted to derive control signals as functions of fuel-air ratio, means for deriving other control signals representing functions of engine horsepower including engine R. P. M., means for deriving other control signals representing functions of manifold air pressure, and another electrical system responsive to the combined aforesaid control signals for computing simulated mass airflow, said last-named system having means for deriving electrical control signals as functions of mass airflow for input to said computing means for determining other simulated engine conditions.

10. In ground-based training apparatus for aircraft personnel, means for simulating engine operation comprising electrical computing means operable according to simulated flight and engine conditions and indicating means responsive to said computing means for representing manifestations of engine operation, said computing means including means adapted to derive control signals as functions of fuel-air ratio, respective means for deriving other control signals representing functions of engine R. P. M., manifold air pressure and carburetor air temperature respectively, and an electrical system responsive to the combined aforesaid control signals for computing indicated horsepower, said electrical system having means for deriving electrical control signals as functions of indicated horsepower for input to said computing means for determining other simulated engine conditions.

11. In ground-based training apparatus as set forth in claim 10, means operable selectively according to simulated ignition check and backfire conditions for modifying input control signals to said electrical system for representing effects of said conditions on engine power.

12. In ground-based training apparatus for aircraft personnel, means for simulating engine operation comprising electrical computing means operable according to simulated flight and engine conditions and indicating means responsive to said computing means for representing manifestations of engine operation, said computing means including an electrical system representing fuel-air ratio adapted to derive control signals as functions of fuel-air ratio, respective means for deriving other control signals representing functions of manifold air pressure, altitude, engine R. P. M. and carburetor air temperature respectively, another electrical system responsive to the combined aforesaid control signals for computing indicated horsepower and means operable according to simulated spark advance for modifying the effect of the fuel-air ratio signal on said last-named system, said last-named system having means for deriving electrical control signals as functions of indicated horsepower for input to said computing means for determining other simulated engine conditions including brake horsepower and torque.

13. In ground-based training apparatus for aircraft personnel, means for simulating engine operation comprising electrical computing means operable according to simulated flight and engine conditions and indicating means responsive to said computing means for representing manifestations of engine operation, said computing means including means adapted to derive control signals as functions of fuel-air ratio, respective means for deriving other control signals representing functions of engine R. P. M., manifold air pressure, cylinder head temperature, carburetor air temperature and altitude respectively, means operable for deriving other control signals representing R. P. M. friction power and other losses incident to engine operation, and an electrical system responsive to combined aforesaid control signals for computing brake horsepower.

14. In ground-based training apparatus as set forth in claim 13, selectively operable means for representing "high" and "low" cooling fan in combination with means representing a function of altitude for regulating a control signal representing power loss incident to engine operation.

15. In ground-based training apparatus for aircraft personnel, means for simulating engine operation comprising electrical computing means operable according to simulated flight and engine conditions and indicating means responsive to said computing means for representing manifestations of engine operation, said computing means including means adapted to derive control signals as functions of fuel-air ratio respective means for deriving other control signals representing functions of engine R. P. M., manifold air pressure and power losses incident to engine operation respectively, an electrical system responsive to combined aforesaid control signals for computing torque, and indicating means responsive to said torque system for representing a torque meter.

16. In ground-based training apparatus as set forth in claim 15, means operable according to simulated backfire conditions for introducing directly to said torque system a control signal for representing decreased torque in simulation of sudden drop in torque due to backfire.

17. In ground-based training apparatus for aircraft personnel, means for simulating engine operation comprising electrical computing means operable according to simulated flight and engine conditions, and indicating means responsive to said computing means for representing manifestations of engine operation, said computing means having means for deriving respective control signals representing functions of simulated air speed, cooling flaps (or the like) position, engine R. P. M., fuel-air ratio and outside air temperature, an electrical system responsive to the combined aforesaid control signals for computing cylinder head temperature, and an indicator controlled by said system for representing cylinder head temperature.

18. In ground-based apparatus as set forth in claim 17 in which means are operable to produce another control signal representing engine cooling fan operation for input to the electrical system for computing cylinder head temperature.

19. In ground-based apparatus as set forth in claim 17 in which means are selectively operable to modify the fuel-air ratio control signal input to the electrical system according to simulated spark advance.

20. In ground-based apparatus as set forth in claim 17 in which means are selectively operable to modify the fuel-air ratio control signal input to the electrical system according to simulated anti-detonation-injection.

21. In ground-based training apparatus as set forth in claim 17 in which the computing means also includes means for deriving control signals representing functions of torque and carburetor air temperature, and the electrical system for computing cylinder head temperature is responsive to combined signals representing fuel-air ratio, torque and carburetor air temperature for representing a detonation condition.

22. In ground-based apparatus as set forth in claim 21 in which the electrical system is responsive to a pair of detonation control signals, a first signal representing functions of torque and carburetor air temperature and a second signal representing functions of torque and fuel-air ratio.

23. In ground-based apparatus as set forth in claim 22 in which the second detonation control signal is applied to the electrical system by means of an electronic relay in accordance with predetermined combined value of the torque and fuel-air ratio signals.

24. In ground-based apparatus as set forth in claim 17 in which the computing means also produces electrical control signals representing respectively, functions of altitude, mass air flow, carburetor air temperature and torque in combination with the previously named control signals for input to the electrical system and in which means are selectively operable according to simulated spark advance and antidetonation injection for modifying at least one of said input control signals.

25. In training apparatus for simulating the operation of actual equipment, a relay system adapted for "fail-in-position" operation for simulating a switch-controlled motor or the like comprising a main relay having a source of voltage and contacts controlled by said relay adapted to complete a holding circuit therefor, a switch representing a power source, and a switch normally controlling said relay, said holding contacts, control switch and power switch being interconnected so that said control switch is ineffective to change the position of said relay in either its energized or de-energized condition upon operation of said power source switch to simulate loss of power.

26. In ground-based training apparatus for aircraft personnel, means for simulating engine operation comprising electrical computing means operable according to simulated flight and engine conditions and indicating means responsive to said computing means for representing manifestations of engine operation including a torque meter, fuel-flow indicator and cylinder head temperature indicator, said computing means including a plurality of inter-acting electrical systems for computing respectively simulated fuel-air ratio; fuel-flow, indicated horsepower, brake horsepower, torque, mass airflow and cylinder head temperature, a plurality of control means representing respectively manifold air pressure, R. P. M. control, altitude and air speed, means adjustable by the student according to simulated spark advance and anti-detonation-injection respectively for modifying the operation of the electrical systems representing functions of torque and cylinder head temperature, means adjustable by the instructor according to simulated backfire and fan failure respectively for also modifying the operation of said electrical systems, and indicating means responsive respectively to the torque, fuel flow and cylinder head temperature systems.

27. In ground-based training apparatus for aircraft personnel, means for simulating engine operation comprising computing means operable according to simulated flight and engine conditions, and indicating means responsive to said computing means for representing manifestations of engine operation, said computing means including a plurality of interrelated electrical systems responsive to adjustment of simulated engine controls for representing respectively engine operating conditions including engine power, fuel-air ratio, engine air flow and cylinder head temperature, one of said electrical systems comprising a servo-potentiometer group representing a first engine condition and means for applying a correction factor to another electrical system representing a manifestation of engine power including a potentiometer of said servo system that is adapted to be energized according to the output of the second system, said potentiometer thereby producing a signal representing combined functions of the first engine condition and said power manifestation that is returned as a correction factor to the input of the second electrical system.

28. In ground-based training apparatus for aircraft personnel, means for simulating engine operation comprising electrical computing means operable according to simulated flight and engine conditions and indicating means controlled by said computing means for representing manifestations of engine operation, said computing means including means for producing signals representing respectively simulated mass air flow to the engine, mixture control adjustment and fuel pressure, an electrical system responsive to said signals in combination for computing fuel-air ratio and for producing control signals as functions of the computed fuel-air ratio, other electrical systems for producing additional control signals representing respectively functions of engine power and manifold pressure, another electrical system responsive to the aforesaid fuel-air ratio, engine power and manifold pressure signals in combination for computing simulated engine fuel flow, and indicating means controlled by said last-named electrical system for representing simulated fuel flow.

References Cited in the file of this patent

UNITED STATES PATENTS

| | | |
|---|---|---|
| 2,506,949 | Burelbach et al. | May 9, 1950 |
| 2,599,766 | Linsley | June 10, 1952 |